June 2, 1964
P. B. KNAPP
3,135,527
WHEELED MARKET CARTS
Filed July 28, 1961
3 Sheets-Sheet 1
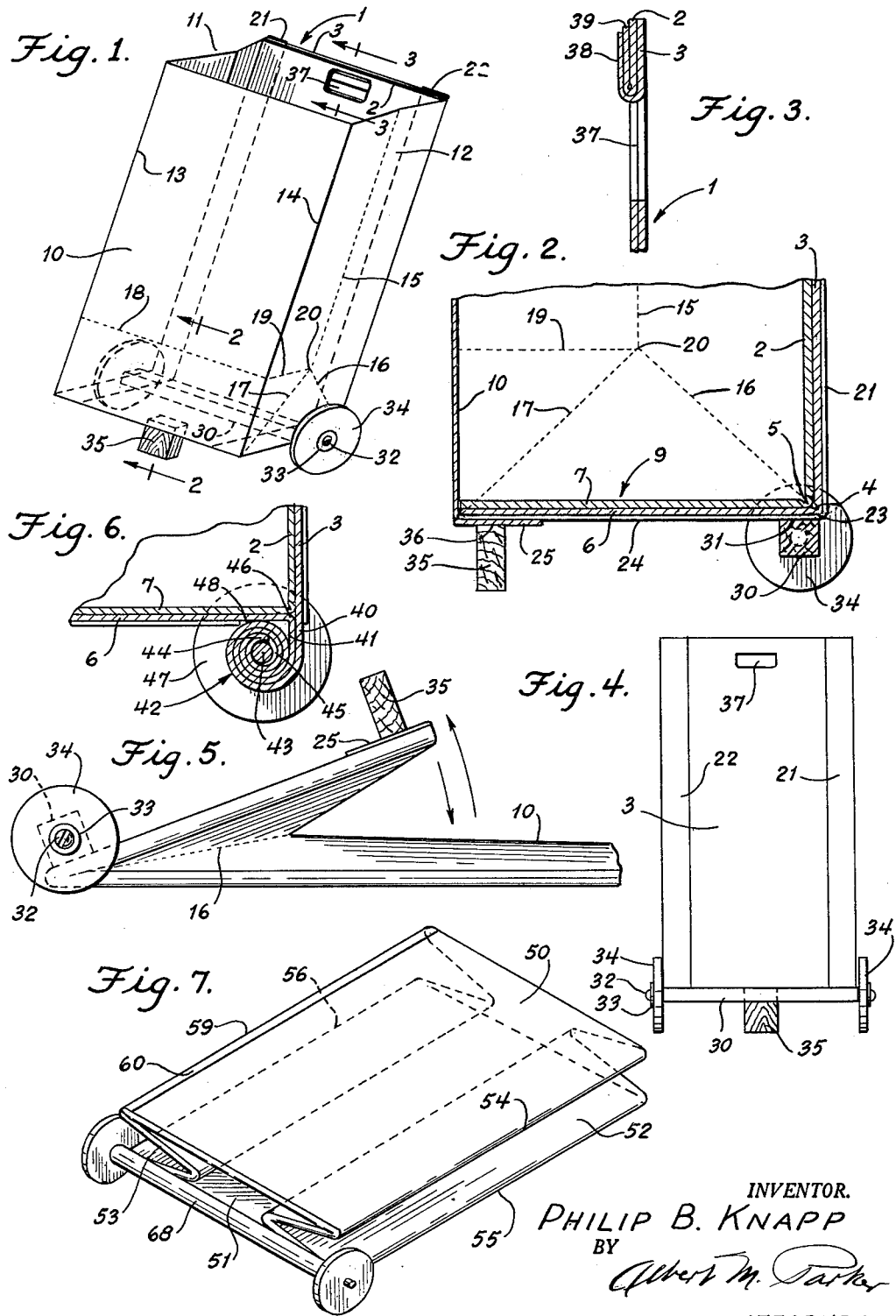
INVENTOR.
PHILIP B. KNAPP
BY
Albert M. Parker
ATTORNEY.

June 2, 1964 P. B. KNAPP 3,135,527
WHEELED MARKET CARTS
Filed July 28, 1961 3 Sheets-Sheet 2
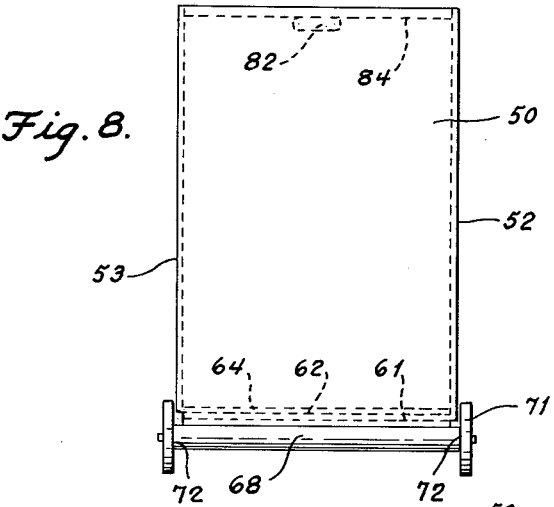
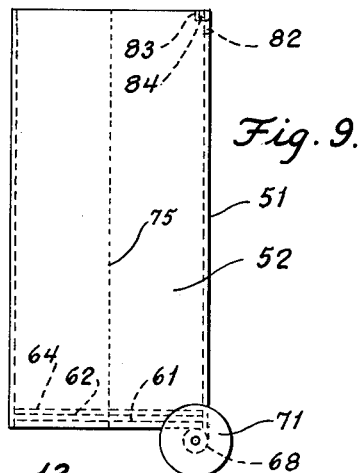
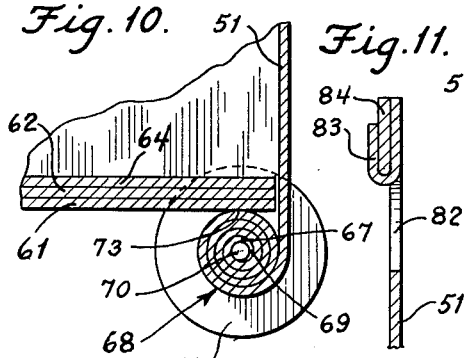
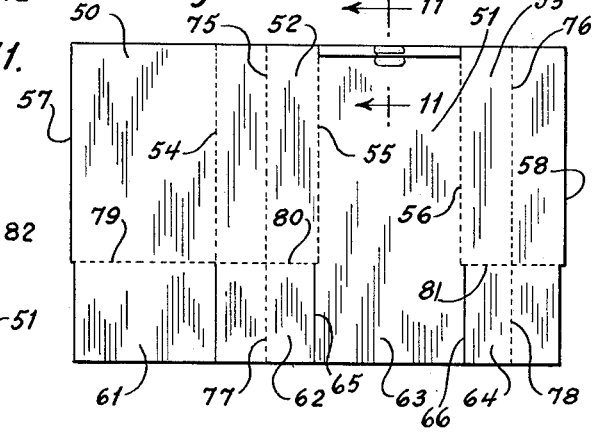
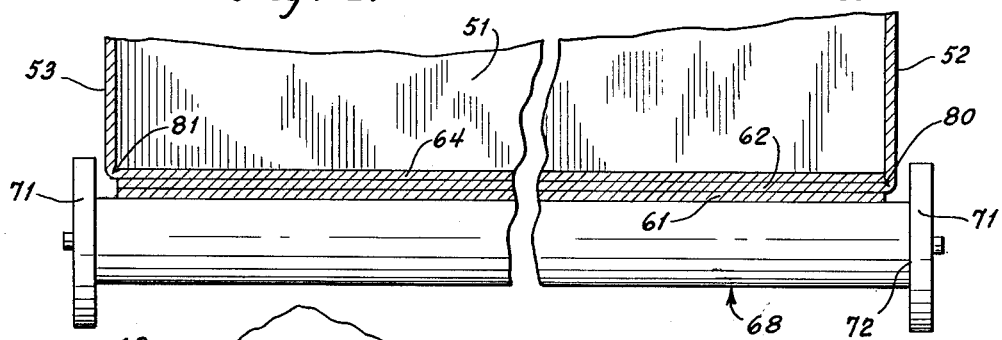
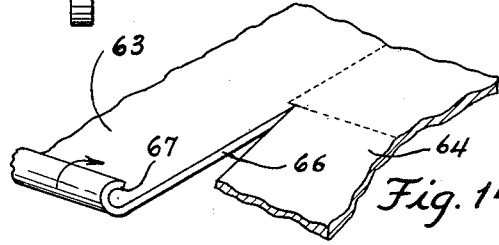
INVENTOR.
PHILIP B. KNAPP
BY
Albert M. Parker
ATTORNEY.

June 2, 1964 P. B. KNAPP 3,135,527
WHEELED MARKET CARTS
Filed July 28, 1961 3 Sheets-Sheet 3
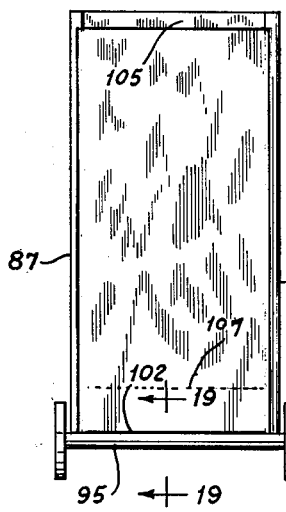
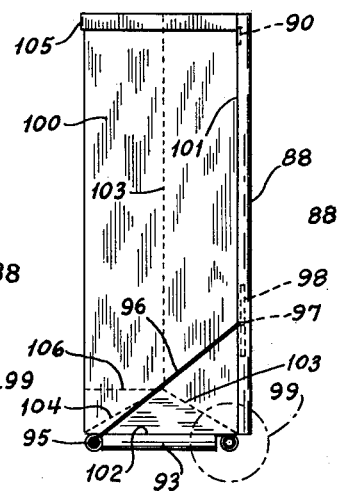
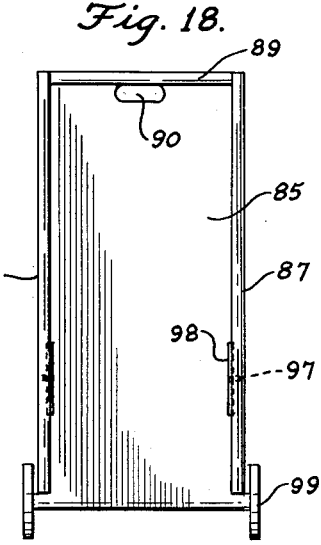
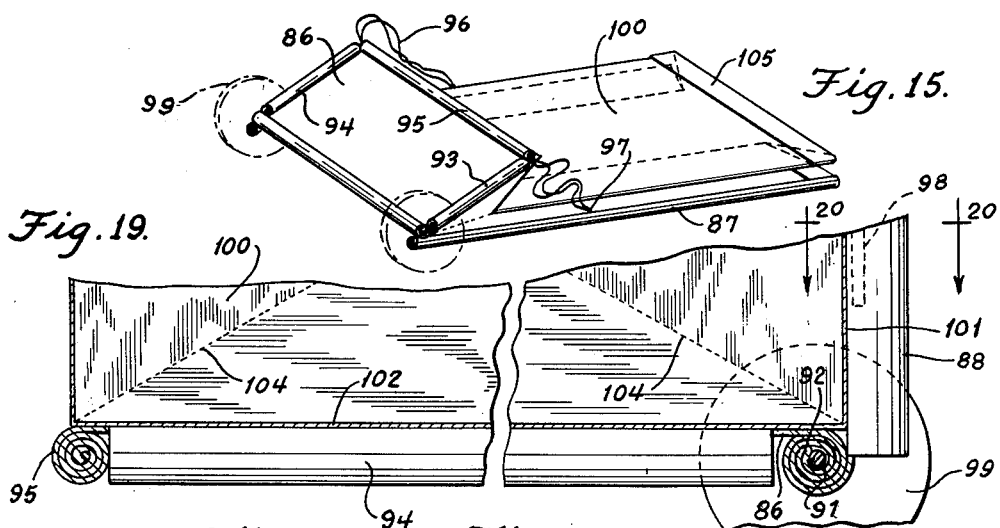
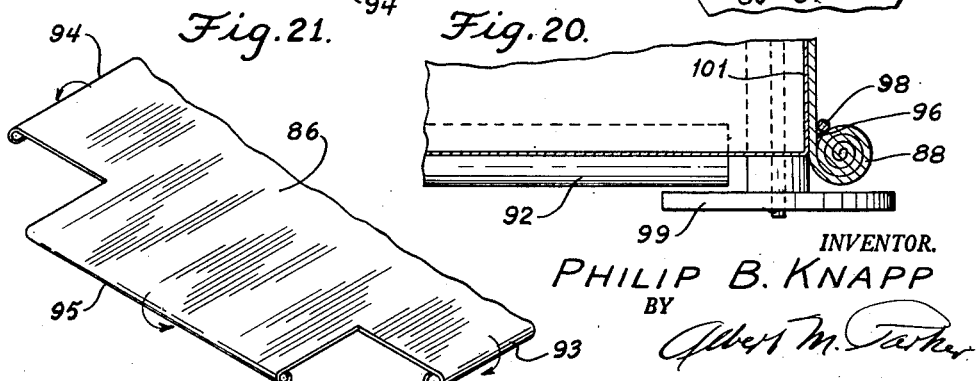
INVENTOR.
PHILIP B. KNAPP
BY
ATTORNEY.

United States Patent Office 3,135,527
Patented June 2, 1964

3,135,527
WHEELED MARKET CARTS
Philip B. Knapp, 41 Eastern Parkway, Brooklyn, N.Y.
Filed July 28, 1961, Ser. No. 127,592
7 Claims. (Cl. 280—36)

This invention relates to wheeled market carts and is particularly concerned with such carts which, though of most economical construction, will nevertheless carry a substantial load of produce from the market and under normal hauls will be usable for making several trips.

Now that the marketing of various commodities, particularly groceries, is carried on largely on a self service basis, commonly from shops known as "supermarkets," a substantial problem has arisen in the transporting of the goods purchased from the shop to the residence or even to the automobile of the purchaser. In the cities, purchasers might well transport the goods purchased directly from the shop to an apartment house dwelling without using an automobile or other conveyance as an intermediary. In surburban areas, however, the problem is not much different, for the purchaser, if using an automobile for transportation, often has to park it a substantial distance away from the shop and must carry the goods to it.

Within the supermarkets themselves suitable metallic wheeled carriers are employed in which to collect the goods from the shelves and transport them to the check-out counters. These carriers, however, are expensive and are not intended to be taken away from the supermarkets. A sufficient number of them are taken to make the loss of these carriers an item of considerable expense to the shopkeepers.

Past efforts that have been made to eliminate this loss and to provide shoppers with economical means to transport their purchases by means of expendable or semi-expendable wheeled carts or carriers have failed. This has been due to such factors as the expense of the carriers on one hand, or the fragility of them where the effort has been made to construct them economically. These and other drawbacks of the prior art are, however, eliminated by the marked carts made in accordance with the principles of the invention.

The market carts of the invention are made principally of the material generally called in industry, and hereinafter in this description referred to as corrugated board. More exactly such material is identified as corrugated fibre board. This material when used alone, or for reinforcement and jointure with paper elements to complete the carrier, keeps the cost down to the barest minimum. This economy is achieved in part by the handling and working of corrugated board in manners not heretofore recognized as practicable. The economy is such that the carts can either be sold at a nominal sum, or given away as a premium item, or as the result of advertising carried by them. Compared to the cost of the commodities that the carts will accommodate, the cart cost is negligible. The energy saved by the customer in wheeling his commodities away would quickly compensate him for the cost of the cart.

In spite of its high degree of utility, the cart of the invention may be readily folded up for storing, taking up, save for the wheels, no more than the space occupied by a few pieces of corrugated board. If need be the wheels can be taken off and dropped inside the cart to be reapplied for the next use.

It is accordingly an object of the invention to provide fully effective wheeled market carts of the utmost economy.

Another object is to provide such carts formed out of inexpensive, but sturdy materials.

Another object is to relate such materials to each other in the formation of such carts in a manner to achieve sturdiness beyond what one would imagine for such materials.

A further object is to provide novel manners of working the materials employed in making up the carts in order to have those materials perform unexpected functions and thereby eliminate the need of additional elements.

A still further object is to provide market carts in accordance with the foregoing, which, in spite of their economy and sturdiness, may be folded away into a small space and when unfolded may be utilized again with full efficiency.

Still further and more detailed objects of the invention will in part be obvious and in part be pointed out as the description of the invention, taken in conjunction with the accompanying drawing, proceeds:

In that drawings:

FIG. 1 is a perspective view of a market cart in accordance with the preferred from of the invention showing the same in fully open position.

FIG. 2 is an enlarged vertical section thereof taken on line 2—2 of FIG. 1 and looking in the direction of the arrows.

FIG. 3 is an enlarged fragmentary section taken on line 3—3 of FIG. 1 and looking in the direction of the arrows.

FIG. 4 is a rear elevational view of the cart of FIG. 1.

FIG. 5 is a side elevational view of the cart of FIG. 1, showing the same in the course of being folded up for storage and as being substantially in folded position.

FIG. 6 is an enlarged fragmentary section of a modification of the cart of FIG. 1 comparable to the showing in the lower right hand corner of FIG. 2, the modification concerning a different manner of wheel mounting.

FIG. 7 is a perspective folded-up view of a modified form of cart, the body of the cart being wholly made of one type of material.

FIG. 8 is a front elevation of the cart of FIG. 6.

FIG. 9 is a right side elevation thereof.

FIG. 10 is a fragmentary vertical sectional view similar to FIG. 6 showing the manner in which the wall material of the FIG. 7 cart is formed around to contain the axle.

FIG. 11 is a view similar to FIG. 3 but showing the hand grip of the cart of FIG. 7.

FIG. 12 is an enlarged fragmentary sectional view transversely of the bottom portion of the cart of FIG. 8, just forward of the axle retaining roll.

FIG. 13 is a plan view of the blank for use in forming the cart of FIG. 7.

FIG. 14 is an enlarged fragmentary part sectional, part elevational view, showing the commencement of the rolling up of a portion of the material for retaining the axle.

FIG. 15 is a view similar to FIG. 7 of a further modification of a market cart in accordance with the invention.

FIG. 16 is a front elevational view thereof.

FIG. 17 is a side elevational view thereof.

FIG. 18 is a rear elevational view thereof.

FIG. 19 is an enlarged vertical fragmentary section taken on lines 19—19 of FIG. 16 and looking in the direction of the arrows.

FIG. 20 is a fragmentary section taken on line 20—20 of FIG. 19 and looking in the direction of the arrows; and FIG. 21 is a fragmentary perspective view showing the commencement of the rolling up of the edges of the blank used for forming the base portion of the cart of FIG. 7.

The carts of the forms of FIGS. 1 and 7 are made to accommodate several times the volume of commodities that can be placed in the largest standard sized paper bag normally used in supermarkets. Rather than forming special oversized bags, however, it has been found more economical in accordance with the invention to make the cart elements themselves up specially. This is particularly true of the preferred form of FIGS. 1–5 where the cart has a corrugated board bottom and back with sides and front made up of paper merely secured to the bottom and back. In this instance the bottom and back provide the stiffening and strengthening needed and even though the sides and front be made of paper not necessarily stronger than that used in a normal strong paper bag, it has been found that the cart, completely filled with canned goods, can be utilized without distortion, collapse, or interference with its normal handling.

The cart of FIG. 1 is in the form of a rectangular container having the upper end open. Its rear wall 1 is formed of corrugated board, preferably of double thickness, having an inner element 2, and an outer element 3. These are preferably co-extensive throughout both continuing past the bottom edge where the outer member 3 is turned in a right angled bend or crease as seen at 4, while the inner portion 2 turns in the bend or crease just within the bend 4. From the bends 4 and 5 the material continues laterally to form the outer and inner portions 6 and 7 of the bottom, generally indicated at 9. Like the back 1, the layers 6 and 7 of corrugated board are substantially co-extensive and are adhered together. The material along the bends 4 and 5 is shown as having its inner surface creased outwardly along the bend. This may be as the result of, or to assist, the folding of the back and bottom towards each other as seen in FIG. 5.

Alternatively, the inner back portion 2 and bottom portion 7 may be terminated just short of each other at the rear corner instead of continuing through the bend 5. This is not necessary for folding however, since the continuous doubled material will fold adequately.

To the thus formed back and bottom of the cart employing double layers of corrugated board adhered together, a front 10 and sides 11 and 12 are applied merely formed out of a single sheet of strong paper. This sheet of paper is preferably precreased at its vertical edges 13 and 14, as well as along the fold lines 15, 16 and 17 in the side portions. There is another, preferably creased, fold line 18 across the front 10 and continuing at 19 part way back across the sides to terminate at 20 where the fold lines 15, 16 and 17 also terminate. This precreasing of the material is preferable to assist and render more facile the folding up of the cart for storage when that is desired.

Though the use of a single sheet of strong paper has been referred to, it is of course obvious that doubled paper may be used instead, or the paper may be replaced by other suitable material. However, paper appears to be the presently most economical material for the intended purpose. Likewise, though materials other than corrugated board may be employed for the back and bottom, corrugated board is preferable due to economy of material and of fabrication of the cart.

Referring now to FIG. 4, it will be noted that the paper making up the sides 11 and 12 and front 10 is merely secured to the rear surface of the back element 3 by having strips 21 and 22 lapped over the back and adhered thereto. These strips continue around bends 23 at the bottom edge of the back and then extend as strips 24 across the bottom as seen in FIG. 2. The only other securing in place of the paper is that where the bottom of the front 10 is turned underneath the bottom piece 6 of the cart in the strip 25. This strip portion 25 extends across the front portion of the bottom piece 6, and is secured to the strips 24 where it overlaps them. Between the strips 24 the strip portion 25 is secured to the undersurface of the bottom element 6.

In the form of FIGS. 1–5, the wheels are shown as carried by a wood cleat 30 extending across the rear portion of the bottom of the cart. The cleat 30, as here shown, is merely adhered along its upper surface 31 to the undersurface of the element 6 and to the strips 24. Additionally, or alternatively, however, the cleat 30 may be stapled to the bottom by staples driven in from the inside of the cart. At its ends, the cleat 30 has axle members secured therein. These may merely be long screws 32 or even nails. Preferably internal and external washers 33 are employed so that the wheels 34 mounted on the members 32 may turn readily. It is of course to be understood that the wheels 34, as seen in FIG. 4, are positioned a short distance outwardly of the sides 11 and 12 of the cart by short outward extensions of the cleat 30.

Though the cleat 30 is here shown as a single continuous member it can be replaced by short separate elements so long as such elements are suitably secured to the cart bottom.

In order that the cart will stand substantially horizontally when opened for use, a suitable foot 35 is preferably provided suitably secured at 36 against the outer surface of the strip 25. This securement may be by means of an adhesive, staples extending through the bottom of the cart, or both.

For assistance in the handling of the cart, an opening for a handhold, 37, is formed through the upper portion of the back 1. This is done by striking out material for the opening 37 and then bending the overlapped portions 38 and 39 of that material upwardly against the inner surface of the back 1. The portion 39 is preferably adhered against the inner layer 2, while the portion 38 extending from the outer layer 3 is turned against and adhered against the portion 39. This doubling up by overlapping enables one to insert one's hand through the opening 37 and get a comfortable but secure grip on the upper portion of the back for easy handling of the cart.

Though in the foregoing it has been generally brought out that various parts of the cart are secured together by means of a suitable adhesive, it is of course to be understood, as already suggested, that other suitable securing means may be employed. Illustrations of these are metal stapling, or metal stitching, though securing by means of adhesive is the presently preferred mode.

A somewhat modified manner for supporting the wheels and one which enables further reduction in the number of parts employed is shown in FIG. 6. This involves an important feature of the invention which is applicable in various positions to various of the other forms. In this instance the outer back piece 3, instead of continuing directly around the bend at the bottom corner into the lower bottom piece 6, continues downwardly at 40 and is doubled back on itself in the portion 41. The portions 40 and 41 are then rolled together to form the involute coil 42 for the mounting and housing of the axle 43. As can be seen, the involute terminates interiorly where the material is bent double at 44, leaving a passage 45 therethrough for the rotatable reception of the axle 43.

The material of the back portion 3 is preferably widened somewhat in the strips 40 and 41 so that the involute 42 not only extends all the way across the back of the cart but also extends out a little at each end to position the wheels out away from the cart sides and to provide end bearings for the inner faces of the wheels to ride against. From the doubled position 44 the corrugated board is returned on itself and in effect unwinds to where the portion 41 is bent laterally at 46 to form the outer bottom portion 6, the same as such portion in FIG. 2. Again the bottom is doubled by having the inner portion 7 overlying and secured to the outer or lower portion 6 as in FIG. 2.

In this form the axle 43 will advantageously be nothing more than a wooden dowel which extends out beyond the ends of the involute 42 a sufficient distance to carry the wheels 47. These wheels 47, like the wheels 34 of the previous form, may suitably and economically be made out of pressed board material, such as hard board. Since the axle turns freely in the bearing opening 45 provided therefor, the wheels 47 need merely be secured to the axle to turn with it. This securing may merely be by having openings of suitable size formed in the wheels and then having the wheels pressed onto the axle. Additionally, adhesive or other simple fastening means may be employed.

The forming of the involute 42 results from the discovery of how to wind up corrugated board transversely of the corrugations and have it adopt a smooth curve formation. Rolling up of corrugated board on an axis parallel to the corrugations has heretofore been done with partial success but attempts to do so about a transverse axis have not worked. The board cracks, breaks, and adopts angular formations instead of curving smoothly. In accordance with the invention it has been discovered that if said board is thoroughly soaked in water it can be rolled up even into a tight involute about either axis without cracking or breaking. When the material dries it retains such coiled formation. For additional strengthening, if desired, an adhesive may be introduced between the opposed surfaces as the material is coiled up.

In the FIG. 1 form, the corrugated board merely makes up the back and bottom of the cart and where that back and bottom are made of one continuous piece, it will be understood that it is a relatively simple matter to modify the FIG. 1 construction in accordance with the FIG. 6 teaching by merely extending the back down below the bottom level to a sufficient extent in the part 40, then double it back on itself in the part 41, leaving sufficient material extending past the bend 46 to form the bottom portion 6. Then the doubled portions 40 and 41 are merely wound up inwardly and transversely of the corrugations to form the involue 42.

Following the FIG. 6 teaching, the integral inner sheet with the back portion 2 being bent at 5 to extend into the bottom portion 7 may be just the same as in FIG. 1. Alternatively, however, the inner sheet may have extending portions in place of the corner 5 which extend in the same manner as the portions 40 and 41, lie between the portions 40 and 41 and are rolled up into an involute with them. Even this can be readily done if the material is wetted sufficiently. In the opposite direction the parts 2 and 7 can be separate members adhered to the parts 3 and 6 respectively.

The cart of FIGS. 7–14 is even of more simple construction than that of FIG. 1, for with the exception of the axle and the wheels, it is all made up out of one blank of corrugated board. Here the blank, as seen in FIG. 13, is of a single thickness of material since no support needs to be provided for any paper element as in the FIG. 1 form. The cart of FIG. 7 has a front portion 50, a rear portion 51 and side portions 52 and 53. These are provided with fold lines 54, 55 and 56 (FIGS. 7 and 13), about which the material is bent to form the vertical corners or edges of the cart. The fourth one of the vertical corners is provided by joining the end edges 57 and 58 (FIG. 13), together as shown at 59 in FIG. 7. This is done by some common means, such as securing of a strip of paper all along the seam to overlie the free edges and secure the assembly together. Such a strip of paper is shown at 60 in FIG. 7.

This cart is completed by the use of bottom portions 61, 62, 63 and 64 extending down integrally respectively from the side wall portions 50–53. The portions 61, 62 and 64 serve to form the bottom of the cart when overlapped one upon another and extended at right angles to the side walls as seen in the solid line showing of FIGS. 10 and 12 and the dotted line showing of FIG. 9. The portion 63, however, extending down from the back element 51, provides the axle housing. This extension, as seen by the lines 65 and 66 in FIG. 13, is wider than the back portion 51 so that the involute to carry the axle will position the wheels a short distance outwardly of the side walls of the cart. To form this involute the portion 63 is suitably wetted. Then, as shown in FIG. 14, it is rolled up from the bottom edge 67 into an involute or spiral formation to provide the axle housing 68. Again, the rolling up is performed in a manner to leave a central opening 69 for the reception of the axle 70, preferably made from a wooden dowel with the wheels 71 pressed onto the ends thereof, as seen in FIGS. 8 and 12. The involute formed out of the tab 63 is of a single thickness of material and terminates inwardly at the end edge 67. Again the axle 70 is rotatably mounted in the receiving opening 69 and the wheels 71 secured on the ends of that axle abut the ends of the involute 68 as seen at 72.

The winding of the involute 68 inwardly underneath the bottom of the cart in the construction of FIGS. 7 through 14 not only provides a bearing and mounting for the axle 70 but also provides a shelf along the line 73 for the supporting of the bottom members of the cart when the cart is opened up ready for use. In the first place, it is to be appreciated that to fold the cart into the FIG. 7 form, the side members 52 and 53 of the cart, as well as their tabs 62 and 64 must have fold lines or creases pressed or rolled into them as shown at 75, 76, 77 and 78. These, taken in conjunction with the transverse fold lines 79, 80, and 81, extending across the borders between the respective side elements and their tabs, enable the folding of the otherwise rectangular box of FIGS. 8 and 9 into the accordion collapsed form of FIG. 7.

The folding presents no problem with respect to the tab 61 extending from the front portion 50. This, as best seen in FIG. 12, is preferably the first of the bottom elements seated in place when the cart is opened out into its fully opened form. The tab 61 folded up against the inside of the front 50 hinges down about the line 79 in the setting up of the cart until it comes in contact with the involute 78 along the upper peripheral line 73 thereof. This positions the tab 61 in a substantially horizontal position, or a position at right angles to the side walls of the cart, and locates it strongly in place in that position rendering it capable of carrying a substantial load. This carrying capability is enhanced when the side tabs 62 and 64 are hinged down from their folded positions up against the sides 52 and 53 to overlie the bottom tab 61 as clearly seen in FIGS. 10 and 12. Also, from the showing in these figures it is quite apparent how substantial the support is for the tab 61 and hence for the hole in the bottom by the involute 68. The bottom of the cart of this form, though the cart be of the same capacity as that of the FIG. 1 form, is again of sufficient strength to carry a load of canned goods filling up the cart without failure.

To fold this cart up to store it, as seen in FIG. 7, the tabs 64 and 62 are first hinged up against their respective sides 53 and 52. Next, the tab 61 is hinged up about the line 79 to lie against the front 50 on the inside thereof. Then, due to the fold lines 75 and 76 formed in the sides of the cart, and the corresponding lines 77 and 78 formed in the tabs 62 and 64, the front and back of the cart may be brought toward each other as the sides are folded inwardly in the manner shown. This cart can accordingly be stored away in less space than that of the FIG. 1 form. It needs no foot member such as the one shown at 35 in FIG. 1, though it is tilted somewhat forward when set up for use, it will stand in that position without any tendency of the bottom folding or hinging up.

For facility in propelling the cart of FIGS. 7–14, the back element 51 is formed adjacent the center of the top thereof with a hand hole 82, the upper border of which is strengthened by turning the stamped out portion of the material 83 inwardly and upwardly. Additionally, inasmuch as the whole manipulation of the cart is taken care of from this one position, it is preferable to have a small reinforcing strip 84 of corrugated board or other suitable material secured to the inner surface of the upper portion of the back 51 and extending all the way across that back as shown in FIG. 8. Hence the upturned portion 83 is secured against the outer surface of the strip 84 as seen in FIG. 11.

A smaller cart, based on the utilization of a standard paper bag as the carrying envelope, is illustrated in FIGS. 16-21. Here corrugated material for supporting purposes is merely provided for the back and bottom. In this instance the corrugated board back 85 and bottom 86 are only of a single thickness. Since these have to support an ordinary paper bag they are reinforced by rolling up the edges of the material. Accordingly, the sides of the back portion 85 are rolled up rearwardly and inwardly throughout the height of the back, as shown at 87 and 88. The top edge of the back is rolled downwardly and rearwardly, as seen at 89, and in this instance such rolling provides a reinforcing upper surface extending across the handhole 90 so no additional reinforcing is needed here. The transverse involute formation rotatably carrying the axle 91 is formed at 92 in the same manner as shown in FIG. 6. In other words, the continuous strip of corrugated material making up both the back 85 and the bottom 86 is doubled upon itself and extended downwardly from the bottom of the back 85 and is then rolled up inwardly into the involute formation 92 in order to rotatably mount the axle 91. Again, as in the showings of FIGS. 6 and 10, the involute extending transversely of the bottom also assists in supporting the bottom.

The sides 93 and 94 of the bottom 86 are rolled up inwardly beneath the bottom to reinforce it while the front edge 95 of the bottom is likewise rolled inwardly to lie beneath that edge of the bottom. The involute coiling of the material at 95, however, is accomplished in a manner to leave a central passage therethrough for the reception of a string, or other supporting member 96, in the event that the use of the same is desired. Where such a string is used, as best seen in FIGS. 15 and 17, it preferably extends through the coil 95 outwardly to the ends thereof, through openings 97, one of which is formed in each of the side reinforcing members 87 and 88, and has its ends suitably fastened in place at the rear of the wall 85. As here shown such fastening is effected by means of wooden cleats 98 (FIGS. 18 and 20) overlying the ends of the string.

The ends of the string when it is used double are extended in opposite directions along the trough formed between the reinforcing rolls 87 and 88 and the back 85. The string ends themselves are held in this trough by suitable adhesive and then the wooden cleats 98 which overlie them are also adhered in place. This effects a secure holding without any obtrusion as would be provided by knots or other fastening means of sufficient size positioned where the string comes through the side rails. The length of the string 96 is such as seen in FIG. 17 that the bottom 86 is not permitted to reach below a horizontal position with respect to the back 85.

The commencement of the rolling up of the side portions for reinforcing the bottom 86 is shown in FIG. 21. The cart here is smaller than those of the previous forms and the purely reinforcing rolls are rolled up tightly without any open center bores. Nevertheless, by wetting the material sufficiently, smooth tight rounded rolls can be formed which stay in place when they dry.

Wheels 99 are suitably secured to the ends of the dowel like axle 91 advantageously being pressed in place thereon. The wheels themselves may, as previously pointed out, be formed of pressed board of various types, whether of cardboard, hardwood, or composite material. Also they may be adhered with respect to their axles.

A standard paper bag 100 is suitably secured in place on the carrier provided by the back 85 and bottom 86. The back wall 101 of the bag is adhered, preferably substantially throughout, to the inner surface of the back 85. Likewise the bottom 102 of the bag is preferably adhered to the upper surface of the supporting bottom 86. The portion of the bag which would otherwise overlie the handle hole 90 is removed so as to not block that hole.

Inasmuch as normal paper bags are made to be folded flat for storage, the fold lines needed for this purpose, with one important exception, are already present, as illustrated at 103 and 104 in the accompanying drawing. The exception is, that the enable the supporting bottom 86 to hinge up readily for the folding of the cart, as seen in FIG. 15, the paper bag must fold readily about a predetermined lines or lines. This is achieved by providing crease or fold lines at the appropriate positions 106 in the side walls and 107 across the front wall of the bag. Thus when it is desired to fold up the cart for storage as illustrated in FIG. 15, it is merely necessary to fold up the bottom and the bag folds flat in the manner in which it was made. In fact, the bottom 86 has a natural tendency to swing up toward the back 85 due to the way the hinge involute 91 is formed of doubled material and also due to the presence of the paper bag.

Corrugated board appears to present the most economical material for use in accordance with the invention. For particular uses, such as for wet laundry carriers, mobile garabage containers and others where dampness is a factor, the corrugated material may be plasticized to render it moisture proof. To avoid interference with the rolling up of desired parts of the material those parts, at least, should not be treated until the cart is otherwise-completed.

Besides the uses for carts in accordance with the invention already mentioned, they may be used for the transporting of a wide variety of items in a wide variety of places. They may also be used as economical toys for children. Hence the term "market cart" is to be considered in more of an illustrative than a limiting sense.

With regard to the paper bags employed, besides ordinary market bags, multiwall paper bags, bags having walls laminated from different materials, for particular purposes such as cement bags and others providing particular characteristics for particular uses may be employed. Where the paper bag employed has sufficient wall strength the rigid bottom, or back, of the cart can in certain instances be eliminated. This enhances the folding of the cart when empty, particularly if only the rigid bottom remains against which the remainder of the cart, being merely the bag, could collapse. Alternately, with the bottom being nothing more than the bottom of the bag collapsing against the rigid back in enchanced.

With respect to a rigid back or bottom, through corrugated board is presently preferred, the invention is not to be considered as being limited thereby, since pasteboard, through presently more expensive, can be similarly worked to provide reinforced edges or axle supports. Another alternative resides in the use of a suitable rigid plastic, preferably having open work webs for back and bottom and molded with appropriate axle carrying elements. This latter is particularly applicable where complete paper bags are employed for the carrying compartment of the cart.

From the foregoing description of the construction and operation or utilization of the various embodiments of the invention as shown in the accompanying drawing, it will be apparent that the invention teaches various manners in which effective economical market carts can be provided. It is understood, however, that though various exemplifications of structure and operation in accordance with the invention are disclosed, by means of the embodiments described in the foregoing and shown in the accompanying drawing, these exemplifications are for the purpose of illustrating the nature and operation of the invention and are not present in a limiting sense. Certain variations and modifications of the structures shown might readily suggest themselves to those skilled in the art without however involving departures from the spirit and scope of the invention. Speaking generally then, it is to be understood that all matter contained in the above description, or shown in the accompanying drawing, shall be interpreted as illustrative and not in a limiting sense.

Having described my invention, what I claim as new and desire to secure by Letters Patent is:

1. A wheeled carrier comprising an envelope substantially rectangular when extended in open position and having open top and being capable of having folded by the bringing of two of the opposite walls thereof toward each other, said envelope including an upstanding substantially rigid back portion, a front portion and side portions, a laterally extending substantially rigid bottom portion extending between the lower edge of said back portion and the lower edge of said front portion, means for hinging said bottom portion upwardly to provide for the moving of said back portion and opposed front portion towards each other for folding, and means substantially at the juncture of said back and bottom portions for mounting a pair of wheels at opposite sides of said envelope, said mounting means being formed from an extension of said back portion and comprising a rigid involute roll of corrugated board wound transversely of the corrugations thereof.

2. A wheel carrier as in claim 1, said back and said bottom portions each being comprised for corrugated fiber board, and said involute roll being formed from extensions of said back and bottom portions would in a direction transverse to the corrugations of said extensions.

3. A wheeled carrier comprising an envelope susbtantially rectangular when extended in open position and having an open top and being capable of being folded by the bringing of two of the opposite walls thereof toward each other, said envelope including an upstanding substantially rigid back portion, a front portion and side portions, a laterally extending substantially rigid bottom portion extending between the lower edge of said back and front portions, means for hinging said bottom portion upwardly to provide for the moving of said back portion and oppose front portion toward each other for folding, and means substantially at the junction of said back and bottom portions for mounting a pair of wheels at opposite sides of said envelope, said mounting means comprising a corrugated board rolled transversely of the corrugations thereof and being formed from an extension of said back portion.

4. A wheeled carrier comprising an envelope substantially rectangular when extended in open position and having an open top and being capable of being folded by the bringing of two of the opposite walls thereof toward each other, said envelope including an upstanding substantially rigid back portion, a laterally extending substantially rigid bottom portion extending from the lower edge of said back portion, readily foldable paper front and side portions secured to said bottom and back portions, means for hinging said bottom portion upwardly to provide for the moving of said back portion and opposed front portion towards each other and for the folding of said paper front and side portions towards said back portion, and means lying beneath said bottom portion substantially at the junction of said back and bottom portions for the rotatable mounting of a wheel axle thereon, said mounting means including a rigid involute roll formed from extensions of said back and bottom portions extending downwardly with respect to the joining edges of said back and bottom portions, and comprising a corrugated board rolled transversely of the corrugations thereof.

5. A wheeled carrier comprising an envelope substantially rectangular when extended in open position and having an open top and being capable of being folded by the bringing of two of the opposite walls thereof toward each other, said envelope including an upstanding substantially rigid back portion, a laterally extending substantially rigid bottom portion extending from the lower edge of said back portion, a front portion and a pair of side portions, means for hinging said bottom portion upwardly to provide for the moving of said back portion and opposed front portion toward each other for holding, said back portion and bottom portion comprising corrugated fiber boards a plurality of side edges of which are rolled into tight involute reinforcing rolls, means substantially at the junction of said back and bottom portions for mounting wheels at opposite sides of said envelope, said mounting means comprising extensions of said back and bottom portions wound in a rigid involute roll in a direction transverse to the corrugations thereof, and a standard paper bag having the bottom thereof secured to the upper surface of said bottom portion and having one side thereof secured to the front surface of said back portion, said paper bag providing said front and side portions of said carrier.

6. A wheeled carrier as in claim 5, and including string means extending between the sides of said back portion and the sides of said bottom portion to support said bottom portion at a predetermined position with respect to said back portion.

7. A wheeled carrier comprising, an envelope formed of a single piece of corrugated fiber board, said envelope being substantially rectangular when extending in open position and having an open top and being capable of being folded by bringing the front and back walls thereof toward each other, said envelope including a front portion, a back portion, a pair of side portions and means intermediate the width of said side portions and extending throughout the height thereof for folding said side portions to collapse said carrier, a bottom portion formed out of a first tab extending from the lower end of said front portion and hinged to lie up against the inner surface of said front portion when said carrier is folded and to lie out laterally with respect to said front portion when said carrier is open, said bottom portion including second and third tabs extending from said pair of side portions and hinged to lie up against the inner surface of said side portions and to fold with said side portions when the same are folded and to lie outwardly in overlapping relationship with respect to each other and with respect to said first tab when said carrier is open, and means for mounting a wheel axle with respect to said carrier, said mounting means including a fourth tab extending from said back portion and forming a rigid involute roll wound transversely of the corrugations of said back portion, said involute roll lying forwardly of said back portion so as to serve as a support for said bottom portion.

References Cited in the file of this patent
UNITED STATES PATENTS

| 393,899 | Haines | Dec. 4, 1888 |
| 1,554,034 | Richie | Sept. 15, 1925 |
| 2,371,472 | Ruff et al. | Mar. 13, 1945 |
| 2,472,203 | Friedmann et al. | June 7, 1949 |
| 2,482,848 | Grant | Sept. 27, 1949 |
| 2,564,939 | Weast | Aug. 21, 1951 |
| 2,572,486 | Isaac | Oct. 23, 1951 |
| 2,610,071 | Davis et al. | Sept. 9, 1952 |
| 2,716,558 | Sullivan | Aug. 30, 1955 |
| 2,843,308 | Paige | July 15, 1958 |
| 3,035,848 | Parker et al. | May 22, 1962 |

FOREIGN PATENTS

| 646,685 | Great Britain | Nov. 29, 1950 |